United States Patent [19]
Seemann, III

[11] 3,983,282
[45] Sept. 28, 1976

[54] FABRIC CONSTRUCTIONS USEFUL AS BUILDING BASES IN FORMING COMPOUND-CURVED STRUCTURES

[76] Inventor: William H. Seemann, III, 1002 Third St., New Orleans, La.

[22] Filed: Aug. 26, 1974

[21] Appl. No.: 500,538

Related U.S. Application Data

[63] Continuation-in-part of Ser. No. 353,340, May 15, 1972, Pat. No. 3,895,160, which is a continuation-in-part of Ser. No. 829,067, May 29, 1969, Pat. No. 3,668,051.

[52] U.S. Cl. .............................. 428/114; 156/180; 428/212; 428/294; 428/401; 428/902
[51] Int. Cl.² ......................................... D03D 17/00
[58] Field of Search .................... 161/55, 57–60, 161/69, 141, 142, 143, 144, DIG. 4; 428/105, 107, 110, 114, 292, 212, 401, 293, 294, 295, 902; 156/180, 181

[56] References Cited
UNITED STATES PATENTS

| | | | |
|---|---|---|---|
| 3,490,983 | 1/1970 | Lee | 161/59 |
| 3,607,589 | 9/1971 | Schirtzinger | 161/55 |
| 3,622,429 | 11/1971 | Kluppan | 161/60 |
| 3,660,215 | 5/1972 | Pawlicki | 161/93 |
| 3,687,768 | 8/1972 | Vaitses et al. | 161/DIG. 4 |
| 3,700,535 | 10/1972 | McCoy et al. | 161/59 |
| 3,784,441 | 1/1974 | Kaemycen | 161/58 |

*Primary Examiner*—James J. Bell
*Attorney, Agent, or Firm*—Llewellyn A. Proctor

[57] ABSTRACT

A new and further improved multi-ply fabric, and process for the manufacture of such fabric, particularly useful in boat building wherein the fabric must fit or assume the shape of compound-curved surfaces to suitably serve as a base or support for resin or liquefied plastics added thereon and cured or hardened as an initial step in the formation of, e.g., a fiberglass reinforced plastic boat hull. The fabric is characterized generally as of a two-ply construction embodying an upper and lower ply between which is "sandwiched" and secured a series of parallel aligned, spaced apart, springy elements of specific character between which can be placed yarns or rovings to impart tensile strength. The plies of the fabric consist of parallel aligned, continuous, pliable filaments bonded to said springy, plastic elements, each filament being laterally aligned with respect to said springy elements, the filaments being sufficiently pliable or flexible to permit some lateral or transverse movement, and also longitudinal movement, of the springy elements so that the fabric construction can assume compound-curved shapes.

10 Claims, 3 Drawing Figures

FABRIC CONSTRUCTIONS USEFUL AS BUILDING BASES IN FORMING COMPOUND-CURVED STRUCTURES

RELATED APPLICATIONS

The present application is a continuation-in-part of application Ser. No. 253,340, filed May 15, 1972, now U.S. Pat. No. 3,895,160, which application is in turn a continuation-in-part of Ser. No. 829,067, filed May 29, 1969, now U.S. Pat. No. 3,668,051 covering Method and Means of Manufacturing Compound-Curved Structures. The disclosure of the patent applications are both herewith referred to and fully incorporated in the present application by way of reference.

FIELD OF THE INVENTION

This invention relates to multi-ply fabrics, or fabric constructions, useful for assuming the shapes of compound-curved objects on which they are placed as bases for support of resins or liquefied plastics added and cured and hardened in the shape of the compound-curved objects as an initial step in the formation of laminated structures. The fabrics have particular utility in a process for the construction of fiberglass reinforced plastic boat hulls. The invention also relates to a method or process for the manufacture of these fabrics.

The above-identified patent discloses a mono-ply fabric type of construction comprising a base of flexible, or pliable, sheeting material, e.g., a loosely woven textile fabric, on which a series of spaced apart elastic, resilient or springy elements are secured and aligned in parallel relationship, one element in relation to another. The base material is porous, and of necessity sufficiently pliable to permit transverse movement, and also limited longitudinal movement, of the springy elements, one in relation to another, so that the mono-ply fabric structure can be fitted to a boat frame to assume its compound-curved shape and then secured thereto to serve as a base upon which resins and liquefied plastics can be applied as an initial step in forming a fiberglass reinforced boat hull. After the mono-ply fabric is so fitted, as disclosed in said patent, by extending the fabric from keel to gunwhale, aligning the springy elements so that the major axis thereof is in a direction perpendicular to the alignment of the keel, the resinous or liquid plastic is then added in quantity sufficient to fill troughs between the springy elements. In a subsequent step, after the liquid plastic or resin has set and hardened, a mixture of laminating resin, talc and chopped fiberglass is brushed or otherwise applied and then rolled to produce a relatively smooth, strong shell substructure which is then sanded to remove the high spots.

Such mono-ply fabric has proven admirably suitable in forming boat structures, and such method of construction has added considerable flexibility in boat building, particularly as compared with prior art methods necessitating the use of molds, which of course do not become a part of the finished boat but rather serve as a means within which a fiberglass boat can be laid, constructed and then removed. While the use of molds in boat constructions yet offer some benefits, mold constructions, inter alia, are extremely costly, particularly where only a relatively few boats of given design are to be built. In other words, a mold is produced for use in constructing a single type boat. Change of design is not possible without changing the mold. The cost of the mold, however, must be added to the cost of the series of specific type boats constructed with a given mold, and hence the cost of the mold itself is added overhead or burden, particularly prohibitive where relatively few boats of a given design are to be constructed.

Prior to the inception of the invention described in said patent, supra, little had been done to change boat building methods requiring mold constructions. Prior art methods generally involved use of molds, or form work which, after initial use to define the shape of the hull, was separated from the hull and did not become part of the finished boat construction. Previous attempts, if any, to manufacture boats without the use of molds, or forms which were separated from the boat after it had been formed, apparently have not been successful. For example, an attempt to form a boat construction wherein a type of fabric, which was to ultimately become a part of the finished structure, is described, e.g., in U.S. Pat. No. 2,813,050 to William F, Hickman, issued Nov. 12, 1957. Pursuant to the disclosure of that patent, stiff wire mesh was used to cover a framework, basically conforming to the shape of a boat, over which a fabric or fiberglass matting was placed as a base, and then resin poured thereover, and permitted to harden. Layer after layer of the resin was applied and hardened until such time as the desired hull thickness had been obtained. The framework, after having imparted its basic curvature, shape of sides and bottom shape, was separated from the wire mesh-resinous structure. In some instances two layers of wire mesh were used with an intervening glass fiber matting, or the wire mesh was sandwiched between two layers of glass fiber matting. The surface of the precast hull containing the wire mesh, or meshes, was then buffed or ground for smoothness. This technique apparently has not proven successful, inter alia, because the structures so produced simply cannot withstand the frequency changing stresses, mechanical and thermal, to which a boat is necessarily subjected. The wire mesh, particularly under the stress of wave actions, has not proven to be an effective reinforcement. This is believed due to the relatively low surface area of the individual wire strands constituting the wire mesh relative to their cross-sectional area. The low ratio is simply not large enough to allow the wire to be effectively bonded into the plastic matrix with sufficient bond strength to keep the individual wires from being broken loose under stress. The metal wires, after breaking loose from the plastic matrix, are all too readily stressed beyond their elastic limit. The result of the breakdown of the bond between the metal wires and the plastic matrix is crazing or fracturing of the laminate, and this can even result in permanent deformation of the hull structure.

Further improvements in the art of boat building, in any event, are made possible by the invention described in application Ser. No. 253,340, supra, which covers multi-ply fabrics. The multi-ply fabrics are used in boat building in much the same manner as the mono-ply fabrics, but are superior to the latter. The multi-ply fabrics, inter alia, possess greater tensile and flexual strength due to the presence of reinforcing fibrous yarns or rovings, especially fiberglass yarns or rovings, which are loaded within voids between elongate plastic elements. The fiber, or glass-resin, ratios are such as to import tremendous tensile strength, and the yarns and rovings absorb or soak up applied resins and liquid plastics to prevent resin drip through at the time the resin is applied. A far superior finish is produced by virtue of using the multi-ply fabrics as contrasted with the mono-ply fabrics, and less labor is required for sanding down and smoothing the finished hull.

The multi-ply fabrics, like the mono-ply fabrics, are admirably suitable for their intended purpose. Nonetheless, it is found that even the multi-ply fabrics are susceptible to further improvement. For example, in the multi-ply fabrics it is found that the warp yarns contained in the outer plies lessen the flexibility of the fabric and, to some degree, this makes it more difficult to lay the material to cover and assume the shapes of compound-curved structures. Moreover, the strength added to the structure by the warp yarns is achieved at extremely high cost. The warp yarns contribute very little to tensile strength, which is the type of strength that is most required, and hence the cost-effectiveness of the warp yarns is extremely low.

Accordingly, among the objects of this invention are:

To obviate the foregoing and other prior art deficiencies, particularly by providing new and further improved fabrics, and processes for the manufacture and use of such fabrics, in the construction of laminated structures of compound-curves and various other shapes.

To provide new fabrics suitable for use in boat constructions, which constructions can admirably and long withstand thermal and mechanical stresses, such as caused by weather and continuous wave actions.

To provide a new fabric, smooth on all faces, improved over that described in U.S. Pat. No. 3,688,051 and copending application Ser. No. 253,340, supra, which material is easy to manufacture at further reduced cost.

These objects and others are achieved in accordance with the present invention comprising a multi-ply fabric, or fabric having a plurality of plied layers, including outer plied layers of pliable or flexible continuous filaments or fibers, suitably yarns or rovings of fibrous, or fibrous textile materials between which is sandwiched a plurality or series of parallel aligned, spaced apart, elastic, resilient or springy elements. The latter, of elongate shape, are constituted of semi-rigid or rigid plastic or plastic-like materials, preferably hardened or cured resins reinforced by yarns or rovings, preferably glass rovings, to impart high tensile and flexual strength to the fabric. The mechanical properties of such fabric are excellent because, e.g., the fiber-resin or glass-resin ratio in the springy elements can be accurately controlled to provide high fiber or glass loadings and the reinforcement highly oriented and unidirectional in the direction where strength is needed. Preferably, yarns or rovings, more preferably glass rovings, are placed within the voids or spaces between the springy elements, and oriented in the same direction as the latter. These yarns or rovings not only add tensile strength to the fabric but also absorb or soak up applied resins and liquid plastics to prevent resin drip-through at the time such materials are initially applied.

The outer plied layers of pliable, or flexible, continuous filaments or fibers of the structure are laterally or perpendicularly oriented as relates to the direction of alignment of said springy elements, and the yarns or rovings placed therebetween and within the voids which separate said elements. They constitute continuous filaments, e.g., monofilaments, spun fibers or threads, strands, yarns or rovings composed in whole or in part of natural or synthetic fibers such as cotton, rayon, Dacron, nylon, Orlon, acetate Acrilan, Crislan, Dynel, Fortel, Kodel, glass fibers, wool and the like. Since these materials add little to tensile strength of the composite fabric structure, high strength is not particularly critical in their selection, but it is essential that they be bondable to said springy elements, either by virtue of their own nature, or the resinous quality of the springy element, or both. In either event, the materials can be bondable by virtue of their own inherent quality, or by virtue of a resin applied to either, or both.

Fibrous materials as used in the construction of the springy elements, or as yarns or rovings for use in imparting great tensile strength, are constructed principally of fibers of average diameter no greater than about ten thousandths of an inch (10 mils), and preferably average fiber diameters range from about one thousandth of an inch (1 mil), and smaller, to about 10 thousandths of an inch (10 mils). Preferably, the fibrous textile materials used in the construction of the springy elements, or as yarns or rovings for containment within the voids, are those having a tensile strength of at least about 200,000 pounds per square inch (psi), and preferably 300,000 psi, and higher.

The outer plies of the fabric, whether continuous filaments, yarns or rovings, are spaced apart, one from another, generally at distances approximating 0.1 to 3 times the distance between adjacent springy elements (center to center) and, as such, readily permit passage of liquid plastic or resin to fill and saturate all of the void space, or yarns and rovings, between the springy elements, as when the material is used in construction. Complete wet-through is essential. The outer plies must, in all embodiments, be sufficiently pliable or flexible to permit both transverse and longitudinal displacement of the springy elements so that the fabric can assume the form of compound-curved structures.

The fabric is particularly useful as a building base in forming compound-curved structures, and is particularly useful in boat constructions to produce boat hulls, decks, tanks, equipment lockers, cabins, and the like. Tanks can be formed without use of a mold, e.g., by wrapping the fabric circumferentially around a framework and then saturating the fabric with liquid plastic or resin. The resin, upon hardening, can be further coated with additional layers of resin, fiberglass, and the like, as desired, to form a laminar structure of suitable thickness. A boat hull, e.g., can be similarly constructed by placing the fabric on a framework with the springy elements and unsaturated rovings aligned in the direction that strength is needed—viz., parallel to the direction of the keel. The fabric is smooth on the outer faces, such that a minimum of sanding is required to provide a smooth surface upon which to apply further layers of plastic. The fabric is also sufficiently porous to soak up applied resins and liquid plastics, but does not permit ready pour-through of these materials at the time of application.

Generally, upon completion of the laminated structure, the frame, e.g., boat hull, becomes an integral part of the object of the construction. In some instances, however, the laminated structure can be separated from the frame, and the latter used continuously, if desired, as a mold.

The invention, and its principle of operation, will be more fully understood by reference to the following detailed description of a specific embodiment, and to the attached drawings to which reference is made in the description. In the description, similar numbers are used to represent similar parts or components and, where subscripts are used in conjunction with numbers, the numbers indicate a plurality of similar parts or components. Numbers used without subscripts, where similar numbers have been introduced with subscripts, are intended in generic sense.

Figure 1:
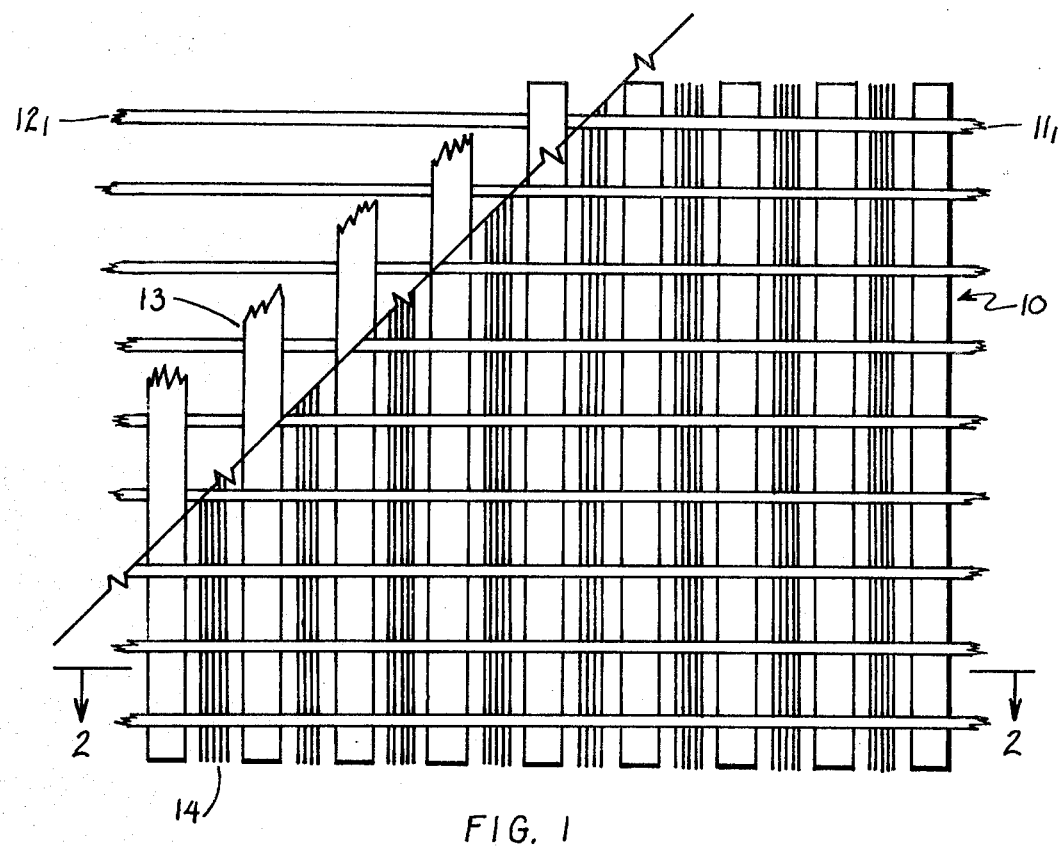
FIG. 1 is a top plan view, in partial section, of a representative segment of a multi-ply textile fabric construction in accordance with a preferred embodiment of this invention.
Figure 2:
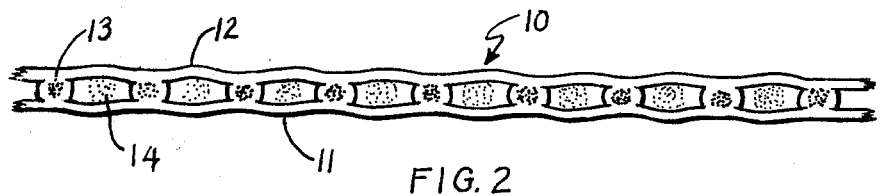
FIG. 2 is a section view taken along line 2—2 of FIG. 1.

Referring to FIGS. 1 and 2 there is shown a segment of two-ply fabric 10 embodying an upper ply 11 and lower ply 12, the upper ply 11 being comprised of substantially parallel aligned yarns $11_1$ while the lower ply 12 is comprised of substantially parallel aligned yarns $12_1$. The yarns $11_1, 12_1$ constituting the outer plies 11,12 are necessarily of flexible or pliable material. Suitably, the individual plies 11,12, which can be the same or different, are formed of textile yarns, of fibrous materials. The plies 11,12 are separated and retained substantially parallel, one member with respect to the other, by a plurality or series of spaced apart elastic, resilient or springy elements 13 sandwiched between and, preferably, bonded to the individual yarns which constitute the plies. A series of yarns or rovings 14 is contained within the voids between the individual elements 13, the rovings imparting tensile strength to the fabric.

In its preferred form, the individual yarns $11_1, 12_1$ of plies 11,12 can be constituted or virtually any fiber which is compatible with the resin coating to be applied and sufficiently pliable to permit substantially unimpeded or free displacement of the individual elements 13, including movement toward or away from one another, as well as movement in a direction lateral or transverse to the major axes of the said elements 13, but most particularly movement in a longitudinal direction. Longitudinal movement of elements 13 in a direction transverse to their major axes is essential for the fabric in its assuming a compound-curved shape. The individual elements 13 are selected to provide the necessary stiffness in the longitudinal direction, or in the direction of the major axes of elements 13. Suitably, yarns $11_1, 12_1$ which constitute plies 11,12 are composed in whole or in part of natural or synthetic fibers such as cotton, rayon, Dacron, nylon, Orlon, acetate, Acrilan, Creslan, Dynel, Fortrel, Kodel, wool, and the like. A yarn constructed in whole or in part of glass fibers, particularly the latter, is especially preferred.

The springy elements 13 are in the form of elongate members oriented in parallel relationship, one member relative to another. These elements 13 are suitably constructed of a solid, rigid or semi-rigid plastic, preferably hardened or cured resins within which are incorporated fibrous, or fibrous textile materials, suitably yarns or rovings. The high ratio of the surface area relative to the cross-sectional area of the individual fibers, which are thoroughly wetted by resin or liquid plastic and set, cured or hardened so that the individual fibers are strongly bonded together with the plastic which serves as a matrix for the fibers, provides sufficient strength to prevent the fibers from being pulled apart or broken loose one from another when the finished structure is subjected to great stress. The ability of this material to withstand great stress, e.g., is sharply contrasted with metal wire, which has not proven an effective reinforcement for structures subjected to high stresses, e.g., boat hulls. This is because wires have a low surface area relative to their cross-section and there is, inter alia, insufficient surface for the wire to be effectively bonded into a plastic matrix with adequate bond strength to prevent its being broken loose when the wire is stressed. Moreover, the tensile strength of available metals is inadequate and certainly far below that of available fibrous materials. Consequently, metal wires can be easily stressed beyond their elastic limit long before the more resilient reinforced plastic material within which the metal is embedded reaches its elastic limit. The result is a breakdown of the bond between the metal and plastic, crazing and fracturing of the laminate and even possible permanent deformation of the hull structure. Furthermore, fibrous materials are far easier to work with than wire mesh, present a smooth surface, do not permit significant resin drip-through provide a high strength-weight ratio, and the incorporation of fibers into the hull shell is advantageous in that there is no problem of corrosion or development of electrical and magnetic fields which is quite important in some usages.

Suitably, the springy elements 13 can be constructed of various thermosetting or thermoplastic plastics or plastic-like materials. Exemplary of such plastic materials are polystyrene, polyethylene, polyvinyl chloride, polyvinylidene chloride, polyvinyl acetate, cellulose acetate, cellulose nitrate, cellulose acetobutyrate, ethyl cellulose and the like. The elements 13, in accordance with an especially desired technique, can be made by dipping or impregnating various yarns with resinous materials which, after setting or solidifying, by various suitable methods, form the desirable rigid or semi-rigid shapes. Glass roving is an especially preferred fibrous material for such use. For example, glass rovings, which add tensile strength to the elements 13 formed therefrom, can be sprayed, dipped or otherwise impregnated with various resins, shaped as desired, and the resin then solidified and hardened to form the said elements. Glass roving thus impregnated with various resins, e.g., epoxy resins, polyesters, phenolic or melamine resins, of the thermosetting type, in a preferred embodiment, can thus be heat set to form rigid shapes suitable for use as springy elements. By preplacement of the resin impregnated yarns of various types between the plies 11,23 in desired orientation, the springy elements 13 can, in either event, be simultaneously bonded to the enveloping plies 11,12 at the time of setting.

The elements 13, as stated, are spaced apart in parallel orientation leaving voids or pockets which are filled with yarn or rovings 14, the function of which is to impart tensile strength to the fabric and lessen drip-through. In a construction, therefore, the fabric 10 is preferably laid so that the rovings 14 (and consequently also the major axes of the springy elements 13) are aligned in the same direction as the keel, this being the direction of greatest stress produced by wave actions when the boat is in use. In construction of a cylindrical shaped water tank, for example, the fabric 10 would be placed so that the rovings 14, and the major axes of the springy elements 13, are wrapped circumferentially about the cylindrical frame on which a tank is to be formed. Virtually any fibrous material of good strength, and compatible with the resin matrix to be formed upon the fabric 10, is suitable for use as rovings. Exemplary of such materials are fiberglass, carbon fiber, graphite fiber, boron filaments, and high strength organic fibers such as Dupont's Kevlar and the like. Fiberglass rovings have been found particularly satisfactory.

Figure 3:
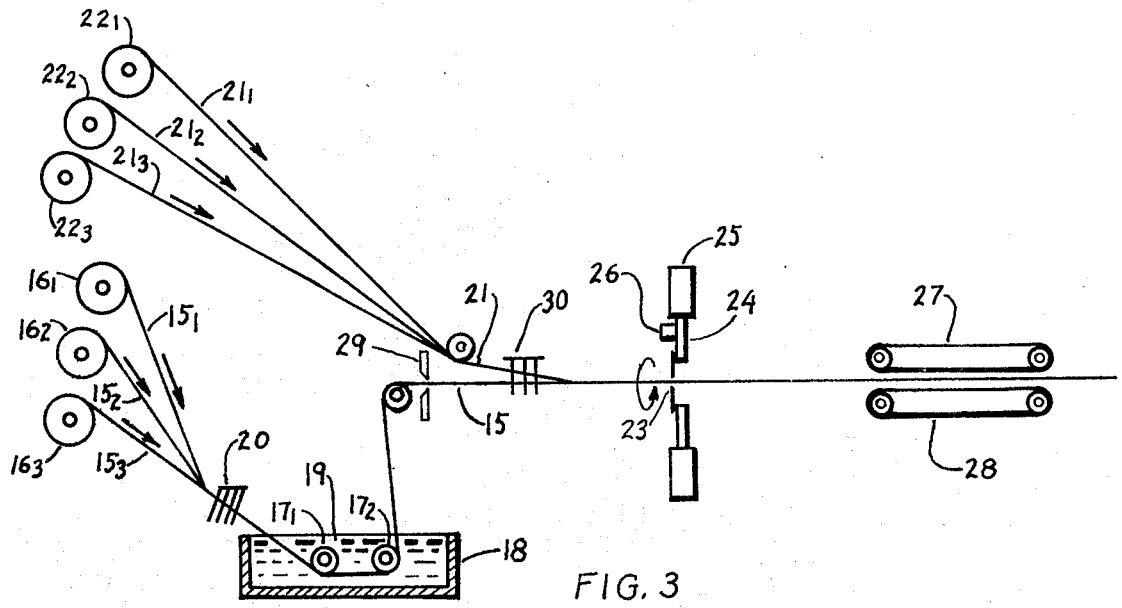
FIG. 3 is a schematic or diagrammatic view of apparatus and process useful in forming the multi-ply fabric construction depicted in the two preceding figures.

A preferred method for manufacture of a suitable and preferred type of fabric 10 is illustrated by specific reference to FIG. 3. A plurality of parallel strands of roving $15_1, 15_2, 15_3$ (e.g., 211 yards/pound continuous filament fiberglass) are unwound from a parallelly arranged series of rolls $16_1, 16_2, 16_3$ and the individual strands brought together and immersed within a resin 19 (e.g., a polyester laminating resin) by passage across rolls $17_1, 17_2$ of bath 18. The series of parallel strands 15, brought together and consolidated by passage through a comb 20, is wet with resin, and formed into round cross-sections (e.g., of 7/64 inch diameter). These resin-saturated strands 15, serially oriented in parallel relationship one to another, aligned and spaced, e.g., 5/16 inch apart (measured from center to center) in alternate series with similarly parallelly aligned unsaturated strands of rovings 21 (e.g., 211 yards/pound continuous filament fiberglass), unwound from rolls $22_1, 22_2, 22_3$ are directed through orifice 29 and comb 30, and then brought forward and aligned in a single plane. Yarns or rovings 23 are then laid in lateral orientation across the entire width, both top and bottom, of the plane formed by the parallel aligned, alternately disposed resin-saturated strands 15 and unsaturated rovings 21. Suitably, this can be accomplished by wrapping the parallel aligned, alternately disposed strands 15 and unsaturated rovings 15 with yarns or rovings 23. Thus, the plane of the precursor fabric can be passed through an encircling rotatably mounted member 24, which is set within a fixed frame 25, which carries a bobbin, or bobbins, 26 and suitable guides (not shown) which wraps the yarn or roving 23 about the precursor fabric as the member 24 is rotated. By adjusting the speed of rotation of member 24 relative to the linear speed of the precursor fabric, the lateral spacing of the yarn or rovings 23 can be readily regulated or controlled. The precursor fabric is then pressed lightly between two heated, Teflon coated plates or Teflon coated endless belts 27,28 to assure good contact between yarns or rovings 23 and strands 15. The applied heat cures the resin, this producing flexible reinforced plastic, or springy elements bonded between two plies of yarns or rovings 23. The unbound reinforcing rovings 21 lie between the springy elements which are formed from resin coated strands 15.

It is understood, of course, that the degree of heat required to bond together the plies of yarns or rovings 23 and resin-impregnated rovings 15 will vary, and different time-temperature relationships will be required for different materials. Also, while pressing is especially preferred, various wet or dry methods known to the art might be used to effect the cure. In generally, a temperature ranging from about 200° to about 400°F. is adequate in most cases to effect the cure. Generally, also, a time duration of from about 3 to 5 minutes is adequate to transfer sufficient heat to the fabric and resin and provide curing.

Having described the invention, what is claimed is:

1. In a fabric construction, constituting an article of manufacture useful for covering and assuming a compound-curved shape wherein is included the combination of at least two plies, characterized as outer plies of flexible material between which is sandwiched a series of spaced-apart, parallel aligned, springy plastic elements of elongate shape, each element constructed with fibers impregnated with resin, cured, and thereby reinforced to form a semi-rigid or rigid material, the outer plies and the springy plastic elements being bonded one to the other to form the sandwich structure, the voids between adjacent springy plastic elements containing fibers in the form of yarns or rovings, the improvement wherein said plies consist of parallel aligned continuous pliable filaments bonded to said springy plastic elements, each filament being laterally aligned with respect to said springy plastic elements, whereby the springy elements can be directionally displaced one toward another, and longitudinally displaced so that the fabric construction can cover and assume the shape of a compound-curved structure.

2. The fabric construction of claim 1 wherein the springy plastic elements are constituted of textile fibers impregnated with resin and cured to form a semi-rigid or rigid material.

3. The fabric construction of claim 1 wherein the springy plastic elements are constructed of an admixture of resin and a material selected from the group consisting of fiberglass fibers, carbon fibers, graphite fibers, boron filaments and high strength organic fibers, cured to form a semi-rigid or rigid material.

4. The fabric construction of claim 2 wherein the fibers have a tensile strength of at least about 200,000 p.s.i.

5. The fabric construction of claim 2 wherein the fibers have an average cross-sectional diameter of no more than about 10 mils.

6. The fabric construction of claim 1 wherein the voids between the elongate plastic elements are filled with textile fibers, aligned in the same direction as the elongate plastic elements.

7. The fabric construction of claim 6 wherein the fibers are selected from the group consisting of fiberglass fibers, carbon fibers, graphite fibers, boron filaments and high strength organic fibers.

8. The fabric construction of claim 6 wherein the fibers have a tensile strength of at least about 200,000 p.s.i.

9. The fabric construction of claim 6 wherein the fibers have an average cross-sectional diameter of no more than about 10 mils.

10. The fabric construction of claim 1 wherein the outer plies are constructed of yarns or rovings bonded to the elongate plastic elements.

* * * * *